United States Patent
Yu et al.

(10) Patent No.: US 8,469,125 B2
(45) Date of Patent: Jun. 25, 2013

(54) SYSTEM AND METHOD FOR CONTROLLING A TRAILER CONNECTED TO A VEHICLE

(75) Inventors: Jinghong Yu, Dublin, OH (US); James W. Post, II, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 284 days.

(21) Appl. No.: 13/071,770

(22) Filed: Mar. 25, 2011

(65) Prior Publication Data

US 2012/0245796 A1 Sep. 27, 2012

(51) Int. Cl.
*B62D 53/00* (2006.01)

(52) U.S. Cl.
USPC ......................................... 180/14.2; 280/448

(58) Field of Classification Search
USPC .................. 280/448; 180/21, 252, 54.1, 14.2; 296/187.01, 203.01
See application file for complete search history.

(56) References Cited

U.S. PATENT DOCUMENTS

| | | | | |
|---|---|---|---|---|
| 3,480,295 | A | * | 11/1969 | Duerksen ...................... 280/408 |
| 3,851,895 | A | * | 12/1974 | Davis ........................... 280/467 |
| 3,880,440 | A | * | 4/1975 | Tidewell ....................... 280/81.6 |
| 4,610,325 | A | | 9/1986 | Anderson |
| 5,244,226 | A | | 9/1993 | Bergh |
| 5,329,451 | A | | 7/1994 | Notsu |
| 5,579,228 | A | | 11/1996 | Kimbrough et al. |
| 6,431,576 | B1 | | 8/2002 | Viaud et al. |
| 7,225,891 | B2 | | 6/2007 | Gehring et al. |
| 7,743,859 | B2 | | 6/2010 | Forsyth |
| 2001/0003393 | A1 | | 6/2001 | Cooper |
| 2008/0224444 | A1 | | 9/2008 | Atley |
| 2011/0018231 | A1 | | 1/2011 | Collenberg |

FOREIGN PATENT DOCUMENTS

| | | |
|---|---|---|
| DE | 3923676 A1 | 1/1991 |
| GB | 2 142 291 A | 1/1985 |
| JP | 11-240461 A | 9/1999 |
| WO | 85/03263 A1 | 8/1985 |

OTHER PUBLICATIONS

A.M.C. Odhams et al.; "Implementation of Active Steering on a Multiple Trailer Long Combination Vehicle"; HVTT11: International Heavy Vehicle Symposium, 2010, Melbourne, Victoria, Australia; Fig. 6a and sections 3.2 and 3.3.
International Search Report and Written Opinion for PCT/US2012/20526 dated May 8, 2012.

* cited by examiner

*Primary Examiner* — Tashiana Adams
(74) *Attorney, Agent, or Firm* — Kenealy Vaidya LLP

(57) ABSTRACT

An articulated vehicle system can include a first vehicle selectively and pivotally connected to a second vehicle. A first powertrain can be mounted on the first vehicle to drive a wheel mounted on the first vehicle. A second powertrain can be mounted on the second vehicle to drive a wheel mounted on the second vehicle independent from the drive of the wheel of the first vehicle. The vehicle system may also include a controller in electrical communication with each of the first powertrain, second powertrain, and steering mechanism to assist in steering and power distribution, especially when reversing the vehicle system.

20 Claims, 3 Drawing Sheets

SYSTEM AND METHOD FOR CONTROLLING A TRAILER CONNECTED TO A VEHICLE

BACKGROUND

1. Field

The disclosed subject matter relates to devices, systems, and processes useful in controlling a trailer connected to a vehicle.

2. Description of the Related Art

People have long been using vehicles including automobiles, sport utility vehicles, and/or light trucks to tow trailers for expanded utility and mobility. FIG. 1 schematically illustrates a tow vehicle 100 and a trailer 101 connected in a manner known in the art that permits the trailer 101 to pivot relative to the tow vehicle 100. The vehicle 100 includes a power train 106 and a steering mechanism 108. The power train 106 propels the vehicle 100 and the trailer 101 via a traction force $F_0$ in a forward direction (or in a reverse direction) in any manner known in the art. FIG. 1 represents the direction of the traction force $F_0$ when the vehicle 100 and trailer travel in a reverse direction. The steering mechanism 108 is configured in any manner known in the art to permit the operator to direct the vehicle 100 to the operator's left or to the operator's right relative to ground.

When traveling in a forward direction, the trailer 101 generally follows the path of the tow vehicle 100. The operator usually is required to compensate for the trailer with use of an increased turning circle. Use of a trailer 101 also typically results in decreased acceleration/deceleration and thus requires increased ramp up distance for a desired terminal speed, and also requires increased stopping distance. Regardless, the operator inputs for pulling the trailer 101 in the forward direction are very similar to those for directing the vehicle 100 without the trailer 101 in tow.

By contrast, when traveling in a reverse direction, the tow vehicle 100 pushes the trailer 101 as indicated by the direction of the traction force $F_0$ in FIG. 1. Operator input is often different when in the reverse direction as compared to when in the forward direction in order for the operator to maintain control. One reason for this is because the pivotal connection between the trailer 101 and the vehicle 100 can complicate the input by the operator of the vehicle 100 when directing the path of the trailer 101. For example, the steering input required to initiate turning of the trailer 101 to the left relative to the operator is in a direction that turns the vehicle 100 to the right. Other variables that can alter the steering input from the vehicle 100 include: different surface inclinations between the vehicle 100 and the trailer 101; a difference in surface type for the vehicle 100 and the trailer 101 (e.g., concrete and sand); uneven surfaces of travel; small obstructions (such as rocks, tree roots, small logs, etc.); and/or other influences that can impart a steering input to the trailer 101. As a result, the vehicle operator may be required to constantly adjust directional input (i.e., left, right, forward and/or reverse) and/or speed input (e.g., fast, slow, stop) in order to steer the trailer 101 in the desired reverse direction. This can increase the time and difficulty for the operator to maneuver the trailer 101 in a reverse direction. An inexperienced vehicle operator can exaggerate this condition because there can be a tendency to overcorrect for undesired trailer direction with incorrect directional input and/or unnecessary speed input.

Thus, it is desirable to provide a control system and method that can permit an operator to steer a vehicle and trailer in a reverse direction with confidence and accuracy, and that can also enhance the efficiency and safety of the maneuver, regardless of the experience level of the operator of the vehicle.

SUMMARY

According to an aspect of the disclosed subject matter, an articulated vehicle system can include a first vehicle selectively and pivotally connected to a second vehicle. A first plurality of wheels can be mounted on the first vehicle, the first plurality including at least one steerable wheel pivotally connected to the first vehicle. A first powertrain can be mounted on the first vehicle, the first powertrain can drive at least one of the first plurality of wheels. The first powertrain can include at least one forward drive ratio and a reverse drive ratio and can drive at least one of the second plurality of wheels when one of the at least one forward drive ratio and the reverse drive ratio is selected. A first steering mechanism can be connected to the at least one steerable wheel of the first plurality to pivot the at least one steerable wheel of the first plurality. The articulated vehicle system can also include a controller in electrical communication with each of the first powertrain, a second powertrain, a steering input sensor, and a gear selection sensor.

According to another aspect of the disclosed subject matter, an articulated vehicle system including a first vehicle selectively and pivotally connected to a second vehicle can include a first plurality of wheels mounted on the first vehicle, the first plurality of wheels including at least one steerable wheel pivotally connected to the first vehicle. A first powertrain can be mounted on the first vehicle, the first powertrain configured to drive at least one of the first plurality of wheels, the first powertrain including at least one forward drive ratio and a reverse drive ratio. A first steering mechanism can be connected to the at least one steerable wheel of the first plurality of wheels to pivot the at least one steerable wheel. A second plurality of wheels can be mounted on the second vehicle, the second plurality of wheels including at least one steerable wheel pivotally connected to the second vehicle. A second powertrain can be mounted on the second vehicle, the second powertrain configured to drive at least one of the second plurality of wheels. A second steering mechanism can be connected to the at least one steerable wheel of the second plurality to pivot the at least one steerable wheel of the second plurality. A steering input sensor can be configured to output data indicative of an intended steering direction input by an operator of the articulated vehicle system. A gear selection sensor can be configured to output data indicative of a selection of the reverse drive ratio. A controller can be in electrical communication with each of the first powertrain, the second powertrain, the steering input sensor, and the gear selection sensor, wherein the controller is configured to manipulate an output of the first powertrain and an output of the second powertrain based on the output data received from the gear selection sensor, and manipulate the second steering mechanism to effect an angular position of the at least one steerable wheel of the second plurality of wheels based on the output data received from the steering input sensor and the gear selection sensor, where the angular position is measured relative to a longitudinal direction of the second vehicle.

According to another aspect of the disclosed subject matter, a trailer is disclosed for use in an articulated vehicle system that includes a vehicle having a plurality of vehicle wheels with at least one of the plurality of vehicle wheels pivotally mounted to the vehicle, a vehicle powertrain having a reverse drive ratio and a plurality of forward drive ratios for driving at least one of the plurality of vehicle wheels, a steering input sensor configured to output data indicative of an intended steering direction input by an operator of the vehicle, and a gear selection sensor configured to output data indicative of a selection of the reverse drive ratio. The trailer can include a hitch assembly configured to releasably connect the trailer to the vehicle and to permit the trailer to pivot relative to the vehicle when the hitch assembly is connected to the vehicle. A plurality of trailer wheels can be mounted on the trailer, the plurality of trailer wheels including at least one steerable trailer wheel pivotally connected to the trailer. A trailer powertrain can be configured to drive at least one of the plurality of trailer wheels. A trailer steering mechanism can be connected to the at least one steerable trailer wheel to pivot the at least one steerable trailer wheel. A controller can be configured such that, when the hitch assembly is connected to the vehicle, the controller is in electrical communication with each of the powertrain, the trailer powertrain, the steering input sensor, and the gear selection sensor. The controller can also be configured to manipulate an output of the vehicle powertrain and an output of the trailer powertrain based on the data received from the gear selection sensor when the hitch assembly is connected to the vehicle. The controller can be further configured to manipulate the trailer steering mechanism to effect an angular position of the at least one steerable trailer wheel based on the data received from the steering input sensor and the gear selection sensor when the hitch assembly is connected to the vehicle, where the angular position is measured relative to a straight forward driving axis of the trailer.

According to another aspect of the disclosed subject matter, a method for controlling an articulated vehicle system including a first vehicle selectively and pivotally connected to a second vehicle can include detecting a selection by an operator of the first vehicle of one of a reverse drive ratio and a forward drive ratio. The method can also include detecting a steering input by the operator of the first vehicle, and determining a first power output based on the detected selection of one of the reverse drive ratio and the forward drive ratio. The method can also include determining a second power output based on the detected selection of one of the reverse drive ratio and the forward drive ratio, and determining a steering angle for a steerable wheel pivotally mounted on the second vehicle based on the detected steering input, where the steering angle is measured relative to a longitudinal direction of the second vehicle. The method can also include signaling a first powertrain to drive a wheel mounted on the first vehicle with the first power output, and signaling a second powertrain to drive a wheel of the second vehicle with the second power output. The method can also include signaling a steering mechanism mounted on the second vehicle to position a steerable wheel pivotally mounted on the second vehicle at the determined steering angle.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
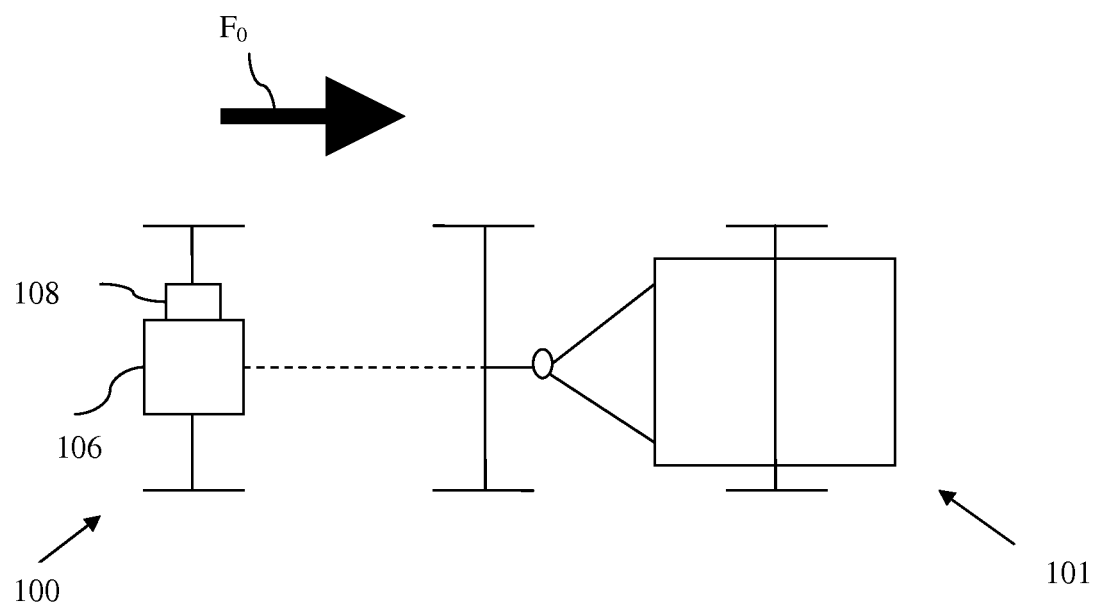
FIG. 1 is a schematic view of a tow vehicle and trailer system in accordance with the conventional art.
Figure 2:
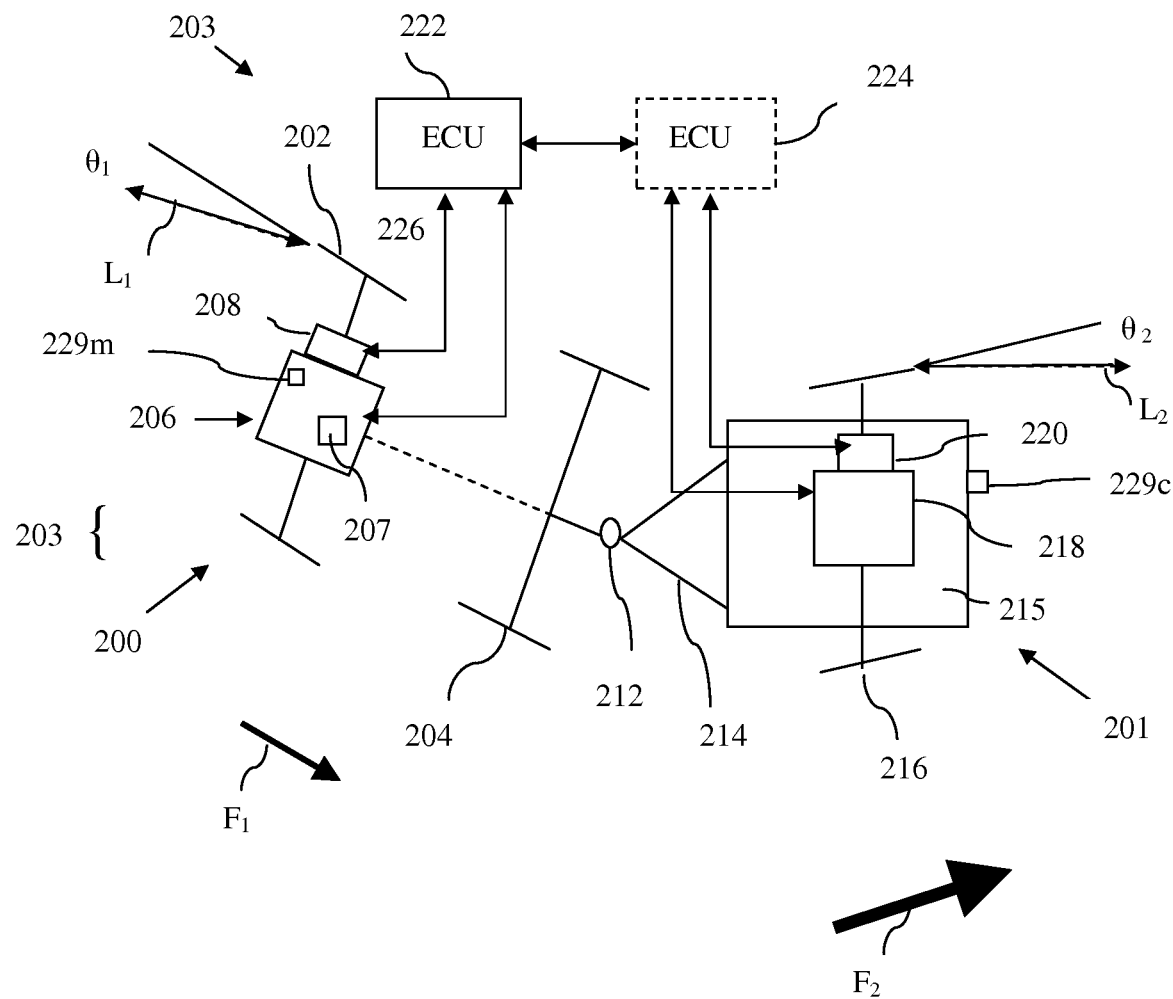
FIG. 2 is a schematic view of an example of a tow vehicle and trailer made in accordance with principles of the disclosed subject matter.
Figure 3:
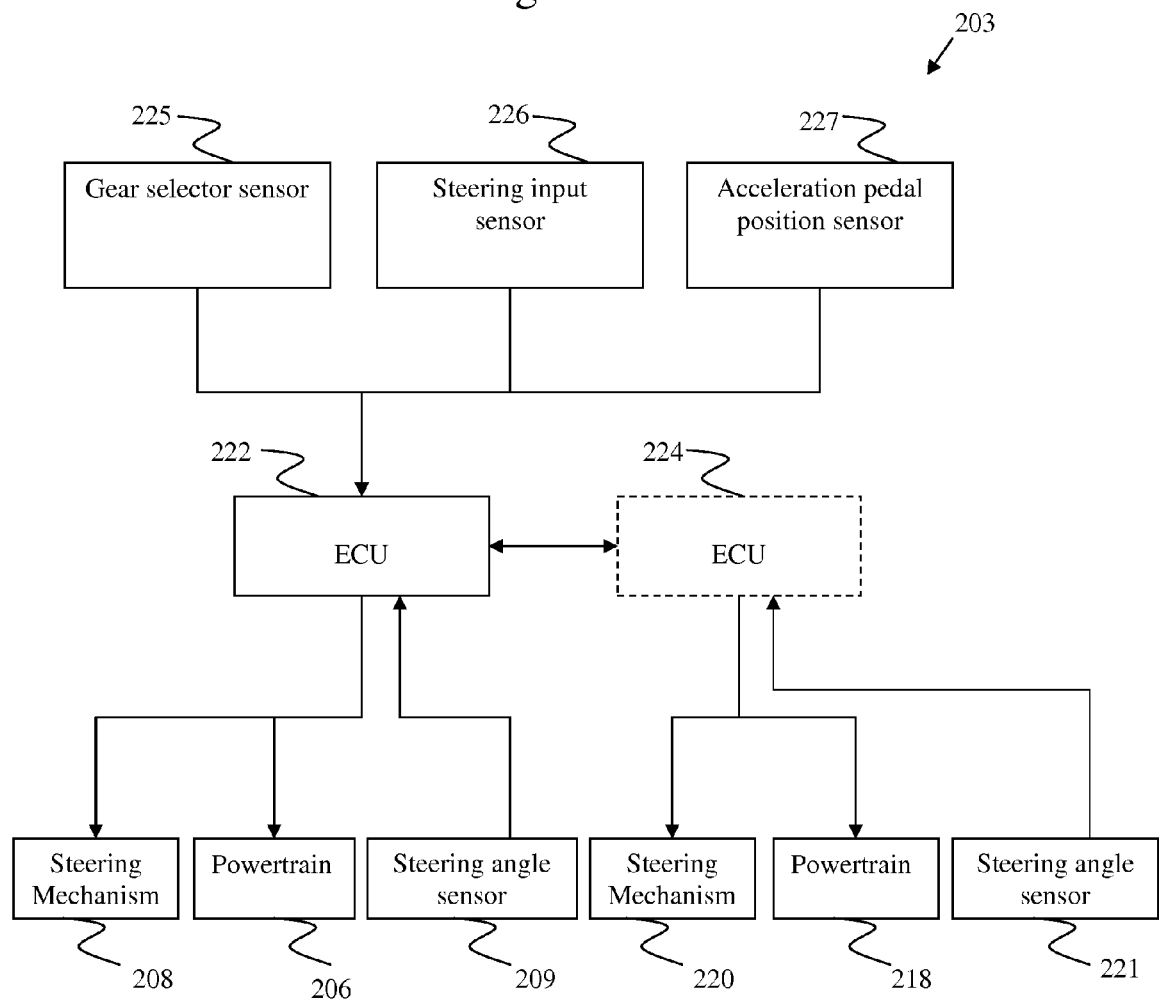
FIG. 3 is a schematic diagram depicting aspects of an example of a control system configured in accordance with principles of the disclosed subject matter.

FIG. 2 illustrates a schematic view of a vehicle system including a tow vehicle 200, a trailer 201, and a control system 203 all configured in accordance with principles of the disclosed subject matter. Further details of the control system 203 are schematically illustrated in FIG. 3. The trailer 201 can be pivotally connected to the vehicle 200 in any manner known in the art, such as by a hitch and buckle, etc. As will be described in more detail below, each of the vehicle 200 and the trailer 201 can include a powertrain, at least one wheel driven by the respective powertrain, and at least one steerable wheel. This arrangement can improve the ease and time by which an operator of any experience level can direct the trailer 201 while driving the vehicle 200 in a reverse or forward direction.

The tow vehicle 200 can include a pair of front wheels 202 mounted in any manner known in the art to permit rotation for travel and pivoting for steering. The tow vehicle 200 can include a pair of rear wheels 204 (or any number wheels as desired or required for the designed utility of the tow vehicle 200) mounted in any manner known in the art to permit rotation for travel. The rear wheels 204 can also be pivotable to provide additional steering capabilities.

The pair of front wheels 202 can be driven by a powertrain 206. The powertrain 206 can include a power source, for example, an electric motor, combustion engine, hybrid power source or another power source known in the art. The power train 206 can also include a transmission or direct drive system or another alternative power transfer system known in the art. The transmission may be automatic, manual or semi-automatic, and with stepped drive ratios or stepless drive ratios, as known in the art. The powertrain 206 can be configured, for example, to drive either the pair of front wheels 202 (front wheel drive), the pair of rear wheels 204 (rear wheel drive) or both the pair of front wheels 202 and the pair of rear wheels 204 (all-wheel or 4-wheel drive). Alternatively, the powertrain 206 may also drive each wheel independently or drive only one wheel in total. The powertrain 206 may also include an acceleration pedal 207 configured to enable the operator of the vehicle 200 to manually adjust the output of the power source.

A steering mechanism 208 can also be operationally connected to the pair of front wheels 202 in order to provide an operator of the tow vehicle 200 the ability to maneuver the pair of front wheels 202 at an angle with respect to a longitudinal axis $L_1$ of the vehicle 200. For example, the steering mechanism 208 can include a steering wheel and mechanical linkages, such as a rack and pinion, known in the art for effecting steerage of the vehicle. The steering mechanism 208 can also include hydraulic components that provide power steering capabilities to the vehicle. Of course, different steering mechanisms known in the art can be used.

Power train 206 may include drivetrain components configured to distribute power from the power source to driven wheel(s). The driven wheel(s) can be the pair of rear wheels 204 for a rear wheel drive vehicle, the pair of front wheels 202 for a front wheel drive vehicle, both (or selective) pairs of wheels for a four-wheel drive or all-wheel drive system, or can possibly be a single wheel for a single wheel drive system. The drivetrain components can be any such components known in the art to transmit power from the power source or transmission to the appropriate wheel(s).

Tow vehicle 200 may include a trailer hitch 212 that can be located near a rear portion of the vehicle 200. Any hitch configuration known in the art can be used, such as but not limited to, a ball hitch, a fifth wheel, and a trailer hook. The trailer hitch 212 can be configured to mate with a vehicle engagement portion 214 connected to a frame 215 of the trailer, thereby allowing the trailer 201 to be connectable to the vehicle 200 for towing or pushing of the trailer 201 by the vehicle 200. The connection between the trailer hitch 212 and the vehicle engagement portion 214 can be selectively disengageable and can be configured to enable the vehicle 200 to pivot with respect to the trailer 201.

The trailer 201 can also include a plurality of wheels 216, a trailer powertrain 218, and a trailer steering mechanism 220. The plurality of wheels 216 can be connected to the trailer frame 215 and can be configured to enable the trailer 201 to roll along a path, road or other desired surface. The trailer 201 can have a straight forward driving axis that is coincident with a longitudinal axis of the trailer 201 when the trailer is longer in a driving direction than a widthwise direction, and is perpendicular to the longitudinal axis of the trailer 201 when the trailer is longer in the widthwise direction as compared to the driving direction. At least one of the plurality of wheels 216 can be pivotally connected to the trailer frame 215. Alternatively, the plurality of wheels 216 can be rigidly connected to an axle (not shown) which is pivotally mounted to the trailer frame 215. Multiple axles can also be provided on the trailer 201 depending on the size and application for the trailer 201.

The trailer powertrain 218 can drive at least one of the plurality of wheels 216 in any manner known in the art. The trailer powertrain 218 can include the same or similar components as described above with respect to the vehicle powertrain 206. The driven wheel(s) can also be the pivotable wheel(s) of the plurality of wheels 216.

The trailer steering mechanism 220 can pivot at least one of the plurality wheels 216 in any manner known in the art. The trailer steering mechanism 220 can also include the same or similar components as described above with respect to the vehicle steering mechanism 208.

The control system 203 can include the powertrains 206, 218, the steering mechanisms 208, 220, a vehicle steering angle sensor 209, a trailer steering angle sensor 221, an electronic control unit 222, a gear selector sensor 225, a steering input sensor 226, and an accelerator pedal position sensor 227. The electronic control unit 222 can be in electrical communication with each of the above-referenced components of the control system 203. The sensors 225, 226, and 227 can be configured to send raw data to the control unit 222 or they can be configured to send processed data to the control unit 222. The control unit 222 and the sensors 225, 226, 227 can be configured with hardware alone or in combination with software in any manner known in the art in order to perform the tasks to be described below. The control unit 222 and the sensors 225, 226, 227 can also be configured to be in one-way or two-way communication. The control unit 222 is commonly referred to using different nomenclature, such as a controller, an electronic control unit (ECU), a central processing unit (CPU), or other similar nomenclature.

When operating the vehicle system in reverse, it is contemplated that the operator can operate the vehicle in two different modes: a "vehicle drive" mode; and a "trailer drive" mode. The different modes can be enhanced by use of a monitor 229m that broadcasts a video feed from camera 229c focused on a rearward driving direction. The camera 229c can be placed on either the vehicle 200 or trailer 201, and should provide a view of the area into which the operator intends to reverse the vehicle system.

In the "vehicle drive" mode, the operator can be "assisted" by the monitor 229m to make steering decisions based on typical external views from windows of the vehicle system, with guidance from the monitor 229m. The controller 203, steering mechanism 208, powertrain 206, trailer powertrain 218, and trailer steering mechanism 220 can be manipulated to assist the typical reversing operation of the vehicle system by providing controlled power and steering based on the operator's various steering and power input (which input would be based on the operator's understanding that the vehicle 200 is being driven/steered in typical reverse fashion).

When in the "trailer drive" mode, the operator can operate the vehicle system as if the operator is driving the trailer 201 as the lead vehicle. In this mode, if a camera 229c and monitor 229m are provided, the operator can rely on the monitor 229m as if driving the vehicle system forward into the area depicted in the monitor 229m. Thus, the steering input by the operator can be solely based on the view in the monitor (which operator input would be different from the operator input in the vehicle drive mode for the same intended action, and would be required to be interpreted differently by the control unit 222). In this case, the control unit 222 could be programmed to output steering angle signals to at least one or both of a steerable wheel of the first vehicle 200 and a steerable wheel of the trailer 201 corresponding to the desired action of the operator, where the desired action could be based solely on review of the monitor (or based on the operators understanding that the steering and accelerator inputs are driving and steering the trailer 201 in a reverse direction). In other words, the steering input of the operator would correspond to inputs similar to those if the operator were steering/driving the trailer 201 into an intended location and as if the trailer 201 were the lead/steer vehicle.

An operator could be required to select this "trailer drive" mode via a switch, which could be accompanied by an audible notification to ensure the operator understands that control is based on the trailer 201 being the operated/lead vehicle. The control unit 222 could also be programmed such that the vehicle system is not able to enter this "trailer drive" mode when the operator selects a forward drive ratio.

With reference to FIGS. 2 and 3, during initiation of the reverse operation of the leading vehicle 200 and trailer 201, the vehicle operator sets a transmission gear-shift of the powertrain 206 to a "reverse" position. The gear selector sensor 225 can detect the position (for example, but not limited to, park, neutral, reverse, drive) and transmits the data to the control unit 222. When the control unit 222 identifies that the "reverse" gear has been selected, the intended steering direction can be adjusted by the operator in order to facilitate reversing maneuvering of both the tow vehicle 200 and the trailer 201. The intended steering direction can be input by the operator via any interface known in the art, such as, but not limited to, a steering wheel, a joystick, a yoke, or levers. The intended steering direction can be detected by the steering input sensor 226 which then communicates the steering input data to the control unit 222.

Additionally, the operator of the tow vehicle 200 may adjust the power source via manipulation of the acceleration pedal 207. The acceleration pedal position sensor 227 can be used to detect the relative position of the acceleration pedal 207 and communicate the data to the control unit 222. The control unit 222 can be configured to determine a total power output demand based on the output received from the acceleration pedal position sensor 227.

The control unit 222 can include a control logic which processes the intended steering direction and the acceleration pedal position, which are input into the control unit 222, in order to determine and output a respective traction force $F_1$, which is sent to the powertrain 206, and a vehicle wheel set angle $\theta_1$, which is sent to the steering mechanism 208. The control logic can be provided by hardware alone, or in combination with software, in any manner known in the art. The vehicle wheel set angle $\theta_1$ can be defined by the angle formed between the pair of front wheels 202 and a line $L_1$ parallel with either the longitudinal axis of the vehicle or a straight/forward driving direction of the vehicle. The control unit 222 can communicate with the powertrain 206 and/or the steering mechanism 208 via wireless communication, hardwired communication or via any other type of communication known in the art.

Additionally, the control logic of the control unit 222 can output a trailer wheel set angle $\theta_2$ to the trailer steering mechanism 220 and a traction force $F_2$ to the trailer powertrain 218, respectively. The trailer wheel set angle $\theta_2$ can be defined by the angle formed between the wheels of the plurality of wheels 216 and a line $L_2$ that is parallel with either a longitudinal axis of the trailer 201 or a straight/reverse driving direction of the trailer 201. The control unit 222 can communicate with the powertrain 206 and/or the steering mechanism 208 via wireless communication, hardwired communication or via any other type of communication known in the art.

The control unit 222 can monitor the gear selected, the steering input sensor 226, the steering mechanisms 208, 220, the acceleration pedal position sensor 227, and the power output of the power sources of the trailer and the vehicle, signal adjustments to the steering angles $\theta_1$ and $\theta_2$, and the traction forces $F_1$ and $F_2$ to best suit the sensed conditions. Therefore, the control unit 222 can guide the vehicle 200 and trailer 201 by using both static and dynamic input from the operator of the vehicle 200 as well as environmental input from sources outside of the vehicle, such as but not limited to, rocks, roots, uneven surfaces, relative inclinations between the trailer 201 and the vehicle 200, different surfaces for each of the trailer 201 and the vehicle 200, etc.

The steering angle $\theta_1$ can represent the angle between the pair of rear wheels 204 and line $L_1$ (i.e., the line parallel with either the longitudinal axis of the tow vehicle 200 or straight driving direction of the tow vehicle 200) for a rear-wheel steer vehicle. Alternatively, the steering angle $\theta_1$ can represent the steering angle of the front and rear wheels 202 and 204 if the tow vehicle 200 is or four-wheel-steer vehicle.

Additional sensors may also be used to indicate the angle between the leading vehicle 200 and the trailer 201. This angle can also be processed by the control unit 222 in order to determine $F_1$, $F_2$, $\theta_1$ and $\theta_2$.

The control unit 222 can be configured to adjust the traction forces $F_1$ and $F_2$ and wheel set steering angles $\theta_1$ and $\theta_2$ without continuous additional input from the operator of the vehicle 200, thus enabling the operator to successfully maneuver the trailer 201 in a desired direction without having to compensate for the driving tendencies of the trailer 201 being pushed in a reverse direction by the leading vehicle 200.

The traction force $F_2$ from the trailer 201 can be set by the control unit 222 to be substantially larger than the traction force $F_1$ from the tow vehicle 200, so that the trailer 201 actually pulls the tow vehicle 200 during reverse maneuvering. Alternatively, the traction force $F_2$ from the trailer 201 can be set by the control unit 222 to be substantially less than the traction force $F_1$ from the tow vehicle 200, so that the trailer 201 is actually pushed by the leading vehicle 200 during reverse maneuvering. Alternatively, traction forces $F_1$ and $F_2$ can be substantially equal. The control unit 222 can set either or both traction forces $F_1$ and $F_2$ to be zero depending on variable input and desired drive direction. In each embodiment, the powertrain 206 of the tow vehicle 200 and the powertrain 218 of the trailer can contribute to the overall movement of the trailer and tow vehicle system. Therefore the operator's input can be minimized while reversing the tow vehicle 200 and the trailer 201 which can result in a smoother path of the trailer 201. Convenience and ease of locating the trailer 201 into a desired positioned can be improved. Also, any input by the operator that may result in an adverse angular relationship between the trailer 201 and the tow vehicle 200 can be minimized by the control algorithm followed by the control unit 222.

While certain embodiments of the invention are described above, it should be understood that the invention can be embodied and configured in many different ways without departing from the spirit and scope of the invention. The trailer controlling system according to the disclosed subject matter can include a second control unit 224 which can communicate directly or indirectly with the trailer powertrain 218 and the trailer steering mechanism 220 via the trailer steering sensor 221.

The second control unit 224 can also communicate with the first control unit 222 and can transfer command information including the traction force $F_2$ and the steering angle $\theta_2$. In an alternate exemplary embodiment, the steering mechanism 208 and steering angle sensor 209 of the leading vehicle 200 can be operationally connected to the second plurality of wheels 204. Control unit 222 can be housed on the tow vehicle 200, on the trailer 201, or at a remote location. Likewise, control unit 224 can also be housed on the tow vehicle 200, on the trailer 201, or at a remote location. In one exemplary embodiment, one control unit 222 can be housed on the tow vehicle 200 and the other control unit 224 can be housed on the trailer 201. In yet another alternate embodiment, the control unit 222 and/or control unit 224 can receive sensor data from additional sensors, such as but not limited, a sensor that senses the initial relative positioning of the tow vehicle 200 and the trailer 201, a road incline sensor, or any other sensor that may provide information that may be used in determining the required traction forces $F_1$ or $F_2$ and/or the steering angle $\theta_1$ or $\theta_2$ of either the leading vehicle 200 or the trailer 201.

In an alternate embodiment, the tow vehicle 200 can have more or less than a pair of front wheels and more or less than a pair of rear wheels. For example, the tow vehicle can have a single steerable front wheel and a single rear wheel that can be driven by the power source directly or via a transmission. The vehicle 200 could also have a single steerable wheel and a pair of rear wheels.

In an alternate embodiment, the trailer 201 can have a single steerable wheel and a pair of rear wheels, where at least one of the pair of rear wheels or the single steerable wheel is driven by the trailer power source directly or via a trailer transmission.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. An articulated vehicle system, comprising:
   a first vehicle;

a second vehicle selectively and pivotally connected to the first vehicle;

a first plurality of wheels mounted on the first vehicle, the first plurality of wheels including at least one steerable wheel pivotally connected to the first vehicle;

a first powertrain mounted on the first vehicle, the first powertrain configured to drive at least one of the first plurality of wheels, the first powertrain including at least one forward drive ratio and a reverse drive ratio;

a first steering mechanism connected to the at least one steerable wheel of the first plurality of wheels to pivot the at least one steerable wheel;

a second plurality of wheels mounted on the second vehicle, the second plurality of wheels including at least one steerable wheel pivotally connected to the second vehicle;

a second powertrain mounted on the second vehicle, the second powertrain configured to drive at least one of the second plurality of wheels;

a second steering mechanism connected to the at least one steerable wheel of the second plurality to pivot the at least one steerable wheel of the second plurality;

a steering input sensor configured to output data indicative of an intended steering direction input by an operator of the articulated vehicle system;

a gear selection sensor configured to output data indicative of a selection of the reverse drive ratio; and a controller in electrical communication with each of the first powertrain, the second powertrain, the steering input sensor, and the gear selection sensor, wherein the controller is configured to, manipulate an output of the first powertrain and an output of the second powertrain based on the output data received from the gear selection sensor, and manipulate the second steering mechanism to effect an angular position of the at least one steerable wheel of the second plurality of wheels based on the output data received from the steering input sensor and the gear selection sensor, where the angular position is measured relative to a longitudinal direction of the second vehicle.

2. The articulated vehicle system according to claim 1, wherein the controller is configured to manipulate the output of the first powertrain, the output of the second powertrain, and the angular position of the at least one steerable wheel of the second plurality of wheels when data received from the gear selection sensor indicates a selection of the reverse drive ratio.

3. The articulated vehicle system according to claim 2, further comprising:

an accelerator pedal movably mounted on the first vehicle and configured to receive input from the operator of the first vehicle indicative of an intended speed for the articulated vehicle system; and a pedal position sensor in electrical communication with the controller and configured to output data indicative of a position of the accelerator pedal, wherein the controller is configured to manipulate an output of the first powertrain and an output of the second powertrain by, determining a total power output demand based on the data received from the pedal position sensor, determining a first power output and a second power output where a sum of the first power output and the second power output substantially equals the total power output, and signaling the first power output to the first powertrain and the second power output to the second powertrain.

4. The articulated vehicle system according to claim 3, wherein the first power output is substantially less than the second power output.

5. The articulated vehicle system according to claim 3, wherein the controller is configured to manipulate a first angular position of the at least one steerable wheel of the first plurality of wheels when the data received from the gear selection sensor indicates a selection of the reverse drive ratio, where the first angular position is measured relative to a longitudinal axis of the first vehicle.

6. The articulated vehicle system according to claim 2, wherein the controller is configured to manipulate a first angular position of the at least one steerable wheel of the first plurality of wheels when the data received from the gear selection sensor indicates a selection of the reverse drive ratio, where the first angular position is measured relative to a longitudinal axis of the first vehicle.

7. The articulated vehicle system according to claim 1, wherein, when the controller manipulates the second steering mechanism, the controller is configured to simultaneously manipulate the first steering mechanism to effect a first angular position of the at least one steerable wheel of the first plurality of wheels based on the data received from the steering input sensor and the gear selection sensor, where the first angular position is measured relative to a longitudinal axis of the first vehicle.

8. The articulated vehicle system according to claim 1, wherein the first powertrain drives the steerable wheel of the first plurality of wheels.

9. A method for controlling an articulated vehicle system including a first vehicle selectively and pivotally connected to a second vehicle, the method comprising:

detecting a selection by an operator of the first vehicle of one of a reverse drive ratio and a forward drive ratio;

detecting a steering input by the operator of the first vehicle;

determining a first power output based on the detected selection of one of the reverse drive ratio and the forward drive ratio;

determining a second power output based on the detected selection of one of the reverse drive ratio and the forward drive ratio;

determining a steering angle for a steerable wheel pivotally mounted on the second vehicle based on the detected steering input, where the steering angle is measured relative to a straight forward driving axis of the second vehicle;

signaling a first powertrain to drive a wheel mounted on the first vehicle with the first power output;

signaling a second powertrain to drive a wheel of the second vehicle with the second power output; and signaling a steering mechanism mounted on the second vehicle to position a steerable wheel pivotally mounted on the second vehicle at the determined steering angle.

10. The method for controlling an articulated vehicle system according to claim 9, wherein:

determining a second power output includes determining the second power out to be zero when selection of one of the forward drive ratio is detected.

11. The method for controlling an articulated vehicle system according to claim 9, further comprising:

detecting a speed request by the operator of the first vehicle, wherein determining the first power output further includes determining the first power output based on the detected speed request when the reverse drive ratio is detected, and determining the second power output further includes determining the second power output based on the detected speed request when the reverse drive ratio is detected.

12. The method for controlling an articulated vehicle system according to claim 11, wherein determining the first power output includes determining the first power output to be substantially less than the second power output.

13. The method for controlling an articulated vehicle system according to claim 9, wherein:

determining a steering angle includes determining the steering angle when the reverse drive ratio is detected; and signaling a steering mechanism includes signaling the steering mechanism when the reverse drive ratio is detected.

14. The method for controlling an articulated vehicle system according to claim 9, further comprising:

providing a camera and monitor on the vehicle system, such that the steering input by the operator of the first vehicle is based on the operator's review of the monitor.

15. The method for controlling an articulated vehicle system according to claim 9, further comprising:

determining a steering angle for a steerable wheel pivotally mounted on the first vehicle based on the detected steering input, where the steering angle is measured relative to a longitudinal axis of the first vehicle; and signaling a steering mechanism mounted on the first vehicle to position a steerable wheel pivotally mounted on the first vehicle at the determined steering angle, wherein signaling a steering mechanism mounted on the first vehicle occurs simultaneously with signaling a steering mechanism of the second vehicle.

16. A trailer for use in an articulated vehicle system that includes a vehicle having a plurality of vehicle wheels with at least one of the plurality of vehicle wheels pivotally mounted to the vehicle, a vehicle powertrain having a reverse drive ratio and a plurality of forward drive ratios for driving at least one of the plurality of vehicle wheels, a steering input sensor configured to output data indicative of an intended steering direction input by an operator of the vehicle, and a gear selection sensor configured to output data indicative of a selection of the reverse drive ratio, the trailer comprising:

a hitch assembly configured to releasably connect the trailer to the vehicle and to permit the trailer to pivot relative to the vehicle when the hitch assembly is connected to the vehicle;

a plurality of trailer wheels mounted on the trailer, the plurality of trailer wheels including at least one steerable trailer wheel pivotally connected to the trailer;

a trailer powertrain configured to drive at least one of the plurality of trailer wheels;

a trailer steering mechanism connected to the at least one steerable trailer wheel to pivot the at least one steerable trailer wheel;

a controller configured such that, when the hitch assembly is connected to the vehicle, the controller is in electrical communication with each of the powertrain, the trailer powertrain, the steering input sensor, and the gear selection sensor, the controller also being configured to manipulate an output of the vehicle powertrain and an output of the trailer powertrain based on the data received from the gear selection sensor when the hitch assembly is connected to the vehicle, and manipulate the trailer steering mechanism to effect an angular position of the at least one steerable trailer wheel based on the data received from the steering input sensor and the gear selection sensor when the hitch assembly is connected to the vehicle, where the angular position is measured relative to a straight forward driving axis of the trailer.

17. The trailer of an articulated vehicle system according to claim 16, wherein the controller is configured to determine a total power output demand based on the data received from the pedal position sensor, and to determine a first power output and a second power output where a sum of the first power output and the second power output substantially equals the total power output, and to signal the first power output to the first powertrain and the second power output to the second powertrain.

18. The trailer of an articulated vehicle system according to claim 17, wherein the controller is configured to signal the first power output to be less than the second power output.

19. The trailer of an articulated vehicle system according to claim 16, wherein the controller is configured to manipulate the angular position of the at least one steerable trailer wheel when the data received from the gear selection sensor indicates a selection of the reverse drive ratio, where the angular position is measured relative to the straight forward driving axis of the trailer.

20. The trailer of an articulated vehicle system according to claim 16, wherein the plurality of trailer wheels consists of two trailer wheels, and a mounting structure configured to mount the two trailer wheels to the vehicle trailer consists of a single axis.

* * * * *